United States Patent [19]
Borek et al.

[11] Patent Number: 5,874,120
[45] Date of Patent: Feb. 23, 1999

[54] METHOD FOR PREPARING MULTISTRAND TWIST FOOD PIECES

[75] Inventors: James R. Borek, Burnsville; James N. Weinstein, Maple Grove, both of Minn.

[73] Assignee: General Mills, Inc., Minneapolis, Minn.

[21] Appl. No.: 924,484

[22] Filed: Aug. 19, 1997

Related U.S. Application Data

[60] Division of Ser. No. 589,743, Jan. 22, 1996, Pat. No. 5,695,805, which is a continuation-in-part of Ser. No. 452,783, May 30, 1995, Pat. No. 5,518,749.

[51] Int. Cl.$^6$ ................................................ A23P 1/00
[52] U.S. Cl. ...................... 426/500; 426/104; 426/516; 426/620
[58] Field of Search ................... 426/500, 620, 426/808, 94, 104, 516

[56] References Cited

U.S. PATENT DOCUMENTS

| | | |
|---|---|---|
| D. 347,515 | 6/1994 | Creighton et al. . |
| 2,013,003 | 7/1935 | Loose . |
| 2,788,277 | 4/1957 | Huber . |
| 2,858,218 | 10/1958 | Benson . |
| 2,858,219 | 10/1958 | Benson . |
| 3,019,147 | 1/1962 | Nalle, Jr. . |
| 3,054,677 | 9/1962 | Graham, Jr. et al. . |
| 3,067,084 | 12/1962 | Nalle, Jr. . |
| 3,077,406 | 2/1963 | Benson . |
| 3,332,781 | 7/1967 | Benson et al. . |
| 3,366,484 | 1/1968 | Weiss et al. . |
| 3,450,538 | 6/1969 | McKown et al. . |
| 3,458,321 | 7/1969 | Reinhart et al. . |
| 3,477,851 | 11/1969 | Benson et al. . |
| 3,557,718 | 1/1971 | Chivers . |
| 3,615,671 | 10/1971 | Shoaf . |
| 3,690,896 | 9/1972 | Maxwell . |
| 3,778,520 | 12/1973 | Reinhart et al. . |
| 4,288,463 | 9/1981 | Groff et al. . |
| 4,409,250 | 10/1983 | Van Hulle et al. . |
| 4,500,558 | 2/1985 | Fulger et al. . |
| 4,563,358 | 1/1986 | Mercer et al. . |
| 4,588,596 | 5/1986 | Bone et al. . |
| 4,710,386 | 12/1987 | Fulger et al. . |
| 4,759,942 | 7/1988 | Von Fulger . |
| 4,837,112 | 6/1989 | Calandro et al. . |
| 4,879,126 | 11/1989 | Willard et al. ................... 426/500 |
| 4,888,192 | 12/1989 | Ramnarine . |
| 4,988,521 | 1/1991 | Fan . |
| 5,024,996 | 6/1991 | Ringe . |
| 5,026,689 | 6/1991 | Ringe et al. . |
| 5,066,506 | 11/1991 | Creighton et al. . |
| 5,102,679 | 4/1992 | Whalen . |
| 5,120,554 | 6/1992 | Farnsworth et al. . |
| 5,126,157 | 6/1992 | Burwell et al. . |
| 5,151,283 | 9/1992 | Foehse et al. . |
| 5,176,936 | 1/1993 | Creighton et al. . |
| 5,182,127 | 1/1993 | Schwab et al. . |
| 5,196,218 | 3/1993 | Schwab et al. . |
| 5,198,255 | 3/1993 | Schwab et al. . |
| 5,200,222 | 4/1993 | Schwab et al. . |
| 5,258,189 | 11/1993 | Efstathiou . |
| 5,338,556 | 8/1994 | Schwab et al. . |
| 5,427,811 | 6/1995 | Fuisz et al. . |
| 5,480,669 | 1/1996 | Zallie et al. . |
| 5,492,704 | 2/1996 | Stubbs et al. . |

FOREIGN PATENT DOCUMENTS

| | | |
|---|---|---|
| 674046 | 11/1963 | Canada . |
| 0 096 305 | 12/1983 | European Pat. Off. . |
| 0 288 120 | 10/1988 | European Pat. Off. . |
| 1 604 585 | 12/1981 | United Kingdom . |
| 1 604 586 | 12/1981 | United Kingdom . |
| WO 93/03909 | 3/1993 | WIPO . |
| WO 95/12319 | 5/1995 | WIPO . |

OTHER PUBLICATIONS

Packaging overwrap for Twizzlers Pull–n–Peel confectionery manufactured by Y & S Candies, a division of Hershey Foods Corp. 1995.

*Primary Examiner*—George Yeung
*Attorney, Agent, or Firm*—John A. O'Toole; L. MeRoy Lillehaugen

[57] ABSTRACT

In its product aspect, the invention provides ready-to-eat cereals and cereal based snacks fabricated from multiple extrudate strands of cooked cereal dough that have been twisted or braided into ropes immediately after extrusion and severed into pieces. The products exhibit greater bowl life in milk and improved organoleptic attributes particularly those fabricated from doughs having a high fiber content. Methods for preparing such cereal based products are also disclosed.

30 Claims, No Drawings

METHOD FOR PREPARING MULTISTRAND TWIST FOOD PIECES

CROSS REFERENCE TO RELATED APPLICATION

This is a divisional of application(s) Ser. No. 08/589,743 filed on Jan. 22, 1996 entitled "Multistrand Twist Cereal Pieces" (now U.S. Pat. No. 5,695,805, issued Dec. 9, 1997), which, is a continuation-in-part application of Ser. No. 08/452,783, filed May 30, 1995 entitled "High Speed Extrudate Weaving Assembly and Methods" (now U.S. Pat. No. 5,518,749, issued May 21, 1996) and which is incorporated herein by reference.

FIELD OF THE INVENTION

The present invention relates to food products and to their methods of preparation. More particularly, the present invention relates to ready-to-eat cereals and cereal based snack foods in the form of multistrand twisted or spun ropes and to their methods of preparation.

BACKGROUND

The sale of breakfast cereals is a highly competitive business. In addition to the particular food components, color, flavor, texture, bowl life and increasingly shapes or other appearance features are important in the marketability of any particular breakfast cereal. For example, pillow-shaped pieces are a shape which is believed to have particular market appeal, with the pieces either being formed of a single homogeneous material or multiple materials such as a coextrudate including an outer shell of a first material such as a cereal material and an inner phase of a second, filling material such as an icing or fruit paste.

One method of forming such pillow-shaped pieces or biscuits is to crimp a rope of dough material at spaced intervals, with the pieces either being individually cut to be independent from each other or with the pieces being cut to remain in continuous ropes with easily fracturable connections. Cooker/extruders are capable of producing dough ropes at relatively high rates of speed in the order of 350 feet (100 meters) per minute, and in fact the uniformity and consistency of the dough ropes increases at high rates of production. The pieces can be produced by passing the dough ropes between counter rotating crimping/cutting rollers, with at least one of the rollers including blades which crimp/cut the rope to the desired longitudinal length of pieces. The cooked cereal dough can be puffed or unpuffed as desired. Other variations include fillings of various types such as fruit pastes, gels or icings for RTE cereals or cheeses for grain based snack products.

In one known variation, the exterior surfaces are gabricated from multiple layers of shredded cooked cereals formed with a mat or web.

The present invention is an improvement in such RTE cereals. More particularly, the present invention provides an improvement to extruded cooked cereal dough ropes formed into individual pieces. The present invention provides cooked cereal dough ropes in the form of multiple thin strands twisted and formed into a braided rope pattern.

The present invention provides twisted multistrand rope products, and new methods for their preparation, that are novel and thus possess great consumer appeal. In addition to their novelty appeal, surprisingly, the roped RTE cereal products also exhibit unexpected and beneficial texture and bowl life properties. The twisted multistrand rope RTE cereal products exhibit improved textures and increased bowl life compared to identical formulations fabricated into conventional shapes such as puffed spheres, filament shreds or flakes.

In particular, bran based RTE cereals in twisted multistrand rope form exhibit especially surprising bowl life. This result is unexpected because when such bran RTE cereals are fabricated into RTE cereals of other shapes, e.g., flakes, these other products tend to get soft in milk immediately. Also, the usual grittiness and dark colors associated with high fiber cereals are not present with the RTE cereal products of the present invention.

SUMMARY

In its product aspect, the present invention provides RTE cereal products in a novel shape in the form of pieces such as biscuits fabricated from twisted or woven multistrand ropes of cooked cereal dough. The twisted multistrand roped RTE cereal products exhibit surprising and desirable texture qualities of better mouth feel and increased bowl life. The surprising improvement in bowl life is especially surprising for those products fabricated from bran formulations. Moreover, the present RTE cereal products provide a more visually attractive appearance.

In its method of preparation aspect, the present invention resides in methods for preparing the present improved RTE cereal products.

In the preferred embodiment the present invention's methods essentially comprise the steps in sequence of:

A. extruding a first extrudable food mass in the form of at least two continuous spaced apart strands along a common line of axis to form a continuous multistrand extrudate axially aligned array;

B. twisting the continuous multistrand extrudate axially aligned array about the common line of axis to form a spun multistrand rope; and C. severing the spun multistrand rope into pieces.

DESCRIPTION

The present invention relates to improved, visually appealing cereal products in the form of twisted multistrand rope pieces. The cereal products are especially useful as RTE cereal products or can be used as cereal based snacks. In its method aspect, the present invention relates to methods of preparing such twisted multistrand rope RTE cereal products. Each of the cereal product ingredients as well as process steps and product use are described in detail below.

Throughout the specification and claims, temperatures are in degrees Fahrenheit and percentages are by weight unless otherwise indicated.

Providing A First Extrudable Food Mass

In the preferred embodiment, the present methods essentially comprise a first step of providing a first extrudable food mass in the form of at least two strands along a common line of axis to form a multistrand extrudate array.

The first extrudable food mass forms the base or primary constituent of the present food products. In the more preferred form, the first extrudable food mass includes a cooked cereal dough that is formed into an outer twisted multistrand roped layer or shell. This outer layer preferably includes a center cavity which can be hollow or which can contain a coextruded filling.

The primary requirement for the first extrudable food mass is the ability to form continuous extrudate strands that will adhere to each other without losing their individual identity. By way of example, useful extrudable plastic foods include, but are not limited to, farinaceous doughs both cooked and uncooked. Also useful herein are sweetened fruit pastes, cheeses and potato doughs (for snack products). Sweetened dried fruit pastes are popular snack food items especially for children both in sheet and roll forms fabricated by drying a sweetened fruit puree.

The prior art, of course, is replete with teachings on methods, apparatus and techniques for preparing cooked or uncooked cereal doughs as well as other useful plastic food materials and the skilled artisan will have no difficulty selecting useful materials for obtaining an extrudable food mass. While in the present description particular reference is made to employment of cooked cereal doughs for the preparation of finished spun products such as RTE cereals and snack products, the skilled artisan will appreciate that the apparatus and techniques can be employed with a wide variety of extrudable food products, especially such plastic foods as low moisture fruit products.

Generally, however, the primary ingredient, of course, of the present cooked cereal dough is a cooked cereal grain material. The cooked cereal material can be made from any cereal grains and starch containing vegetables including those which are members selected from the group consisting of wheat, oats, rice, potatoes, corn, barley, rye, sorghum, triticale and mixtures of these. The cooked cereal mass, of course, can also optionally include conventional cereal ingredients such as salt, minerals, malt syrup, sugar(s), fiber (e.g., bran, cellulose, pectin, psyllium), vitamins, flavor and colorants.

In a preferred embodiment, the cereal grain material comprises a whole grain ingredient, e.g., soft wheat or whole oats. In other embodiments various cereal materials such as cereal flours (whether whole grain or a cereal flour fraction) or cut cereal pieces can be used.

In producing a cooked cereal dough, a dry blend of cereal ingredients is well mixed and then combined with water and mixing with heat to cook or gelatinize, at least in part, the starchy component of the cereal composition. In certain embodiments, upon further mixing, the gelatinized or cooked cereal can be formed into a cooked farinaceous dough. A variety of well known cooking methods and equipment can be used to prepare a cooked cereal dough. For example, the wetted cereal blend can be processed in an atmospheric cooker extruder or in a low pressure (i.e., up to about 22 psig, 145 kPa) and agitated steam cooker each of which form a cooked cereal mass. The cooking step is generally for longer times (e.g., 0.5 to 3 hours) and typically, temperatures between about 190° F. to 265° F. (87.8° to 129° C.). The process can be batch or semi-continuous. The cooked cereal mass is then worked to form a cooked cereal dough.

In another embodiment, the cooking and dough forming steps are performed simultaneously in a high pressure (200 to 3000 psi; 1380 to 21000 kPa), cooker extruder (e.g., a single or twin screw) for short times (e.g., 0.5 to 12 minutes) which discharges the cooked cereal mass in the form of a cooked dough rope extrudate.

In particular, it has been found that the present methods can be used with a high fiber or bran wheat cooked cereal dough to provide an improved bran wheat finished RTE cereal. The bran RTE cereal product is characterized by a long bowl life and by the absence of a gritty mouth feel upon consumption. Such a non-gritty mouth feel is obtained even though the bran has not been specially processed or comminuted to particular particle sizes prior to cooking as previously thought to be essential. Thus, a heretofore thought of as essential feature of an improved bran RTE cereal can be eliminated.

A wide variety of terms are used in the art to indicate a "high fiber" cereal. Most broadly, and as used herein, a "high fiber" RTE cereal includes any RTE cereal product having a fiber content greater than the natural fiber level of the whole grain from which the cereal product is made. For example, whole wheat naturally contains about 1.5% to 2.5% insoluble fiber. Total dietary fiber for a grain includes both the insoluble fiber component as well as the soluble fiber component. The fiber is primarily associated with the bran. The total dietary fiber content for whole wheat which includes the bran fraction, is about 8% to 12% fiber. Thus, a high fiber wheat RTE cereal product contains more than about 12% total dietary fiber or more than 2.5% insoluble fiber.

Of course, different species of cereal grains and cultivars within the species will vary in their various attributes including fiber level. Moreover, the fiber content of various grains vary as well. Oats are generally highest in fiber having about 7% to 10% total dietary fiber while rice having only about 0.9% fiber is generally the lowest in fiber content.

An example of a high fiber cereal is a bran wheat cereal. The bran formulas useful herein include both regular and high bran variations. Regular bran RTE cereal formulations typically include about 20% to 50% by weight bran. High bran, including all bran products, can range from 50% to 100% wheat bran. The resultant products have a total dietary fiber ("TDF") of about 9% to 45%. In still other variations, the cereals can be fortified with concentrated sources or even pure sources of fiber such as gums (e.g., guar gum, gum arabic, psyllium, xanthan gum, locust bean gum and mixtures thereof). Such RTE cereal compositions can range up to 12 g/oz of fiber.

In other variations, e.g., for cookies, the extrudable dough mass can be fabricated from substantially uncooked cereal doughs. In practical use, the methods for preparing a finished food piece from an uncooked cookie dough can additionally include a baking step (e.g., at 300° to 400° F., 150° to 205° C.) to form baked cookie pieces. In still other variations, the first extrudable mass can comprise a potato dough such as for snack products.

Immediately prior to extrusion, the temperature of the cooked cereal dough generally ranges from about 210° to 300° F. (98.8° to 150° C.). The cooked cereal mass generally has a moisture content ranging from about 9% to 15%.

The cooked cereal dough can be formulated and extrudate conditions selected in known manner to form unpuffed cooked cereal dough extrudates, puffed extrudates or partially puffed extrudates. In more preferred embodiments, the extruded dough filaments are at least partially puffed. Unpuffed extrudates generally have a density of about 0.8 g to 0.9 g/cc while puffed extrudates range in density down to 0.06 g/cc. By "at least partially" puffed herein is meant a density of lower than 0.25 g/cc. Of course, the bulk densities of RTE cereal made from pieces of such compositions will generally be lower due to the voids between the pieces.

Generally, the cooked cereal dough strands will tend to puff if immediately prior to extrusion the temperature of the dough ranges from about 110° to 190° C. (230° to 375° F.) and the moisture content ranges from about 12% to 35%, preferably about 15% to 25%. Lower moisture contents within the above range result in greater puffing. However, the puffed strands may undesirably tend to fail to adhere to one another. Higher moisture contents, e.g., above 25%, tend to result in finished RTE cereal products that are too chewy.

The cooked cereal dough generally will lose some moisture upon extrusion to atmospheric pressure as some moisture flashes off and after extrusion have a moisture content of about 5% to 15%. The dough at this point is plastic in nature due to the temperature, moisture and condition of the starch. The plastic nature of the cooked cereal dough allows for the individual strands upon twisting to adhere to one another but without losing their individual identity.

The cooked cereal dough is extruded in the form of at least two continuous dough strands or filaments. The number of strands that are coextruded can range widely. Good results are obtained when the number of strands range from about 2 to 30, preferably about 3 to 8. The greater the number or the larger size of individual strands that are subsequently spun together, the tighter the spun pattern formed in the resultant multistrand rope and easier for the rope so formed to contain any filling to prevent leakage.

Preferably, the dough strands are equally spaced apart from one another about the periphery of their common axis. The strands can range from about 0.1 to 8 mm in diameter, preferably about 1 to 5 and most preferably about 2 to 3 mm in diameter. Such a diameter can be easily obtained by extrusion through suitably sized die port taking into account any expansion due to the dough puffing.

For puffable cereal doughs, the expansion ratio generally centers about a ratio of about 3:1 in the ratio of final diameter to die port diameter. High fiber cereals may have a lower ratio (e.g., about 2:1) since high fiber cereal dough tends to puff less. Conversely, cereal doughs fabricated from formulations low in fiber and high in starch will have higher expansion ratios (up to 8:1 for highly starchy compositions). In more preferred embodiments, the individual strands are spaced apart at least twice the diameter of the smaller or smallest of the diameter strands. While selection of a particular strand diameter might appear to be a mere design choice, selection of particular diameters and related die port size openings in common with the to-be described spinning step has surprisingly been found to be important to the realization of the improved bowl life and organoleptic attributes of the finished RTE cereal products.

In this first step, in the preferred embodiment, importantly the strands are extruded, preferably continuously, parallel to each other and along a common line of axis.

The individual strands after exiting the diehead can range in diameter from about 0.5 mm to 5 mm, preferably, 1 to 3 mm in diameter.

By appropriately spacing the die ports on the rotor, a spun rope with a central cavity can easily be formed. Pieces formed from ropes having an interior cavity can be either hollow or a center filling can be disposed within the center cavity. The cavity can range from about 2 mm to 10 mm, preferably 3 mm to 8 mm in diameter. To assist in the formation of a hollow cavity, optionally, a compressed gas can be coextruded into the center cavity. This can be used to decrease bulk density by maintaining an airy hollow center.

In the most preferred form, the extrudate is coextruded with a filling such as from fruit puree, frosting, another dough, or the like. If desired, a center filling can be coextruded into the center cavity to form center filled finished food pieces. A wide variety of center fillings can be employed such as fruit or vegetable pastes (raisin, strawberry, blueberry, apple, apricot, cherry, cranberry, orange, tomato, raspberry, grape), cheeses, icings or confections. The moisture contents and water activities ("$A_w$") are adjusted in known manner to provide for a shelf stable product.

For example, a useful filling composition is an aerated sugar based confection or marshmallow having a formulation as follows:

| Ingredient | Weight % |
| --- | --- |
| Sugar | 80 to 99 |
| Gelatin | 1 to 5 |
| Apple bits | 0 to 10 |
| Water | 0 to 5 |

In still other variations, the filling can be a melted dextrose and gelatin admixture which results in a center filling being a hard marshmallow foam or marbit.

Generally, the filling will be characterized as having a low water activity so as to have compatibility with the cereal shell over typical storage times. The $A_w$ of the filling can range from 0.1 to 0.4.

In still another variation the center filling is formulated with dehydrated fruit bits, e.g., 1/16 to 1/8 inch in size in about 1% to 25%, preferably about 5% to 15% of the filing composition.

If desired, the center filling can be a second RTE cooked cereal dough. Such a product can provide an appealing different flavor, texture or appearance from the cereal dough formulation of the exterior rope phase of the product.

Also useful as the center filling is an uncooked cookie dough such as a conventional sugar cookie dough (sugar: about 20% to 40%, dry basis, about 15% to 25% fat, especially from butter, and the balance flour, salt, egg solids, flavors and other conventional ingredients). After drying, (e.g., to about 3% to 8% moisture), the resultant finished product is desirably characterized by a dual texture as a result of the RTE cooked cereal dough exterior portion formed by the spun strands and the cookie dough based interior. If desired, both the exterior strands and center filling are each fabricated from an uncooked cookie dough. The resultant finished product is in the form of a shortbread type biscuit.

B. Forming a Spun Rope

The second essential step of the preferred embodiment is immediately thereafter (i.e., while the dough is still plastic and able to adhere to itself) to twist the multistrand extrudate around the common line of axis to form a multistrand helix or spun rope.

In the preferred embodiment of practicing the present invention, the first and second steps can be practiced by extruding the extrudable food mass from a chamber having a rotatable rotor having at least two spaced apart die ports through these rotor die ports to form the continuous extrudable food strands or filaments. The rotor is rotated to spin or twist the continuous extrudate food strands to form the present helical multistrand rope.

Especially suitable for use as equipment to perform this step are those improved equipment and methods described in the commonly assigned parent application U.S. Ser. No. 08/452,783 entitled "High Speed Extrudate Weaving Assembly and Methods" which is incorporated herein by reference. The apparatus therein described includes an assembly including a rotor extending into a rotor bore and into a dough chamber of a die housing, with the rotor rotating at relatively high speeds in the order of 4,000 RPM. A bushing is provided in the rotor bore to provide a seal with the rotor. The bushing has a small clearance with the rotor sufficient to reduce frictional forces to minimize wear while effectively preventing passage of the extrudable dough under pressure in the order of 2,800 psi (200 kg per square centimeter or $1.9 \times 10^4$ kilo Pascals) through the rotor bore and around the rotor. The dough which does pass through the small clearance is allowed to fall away from the rotor outside of the rotor bore. In the preferred form, the die housing includes a cooling passage for circulation of cooling fluid to cool the die housing adjacent the rotor bore to prevent the dough passing through the small clearance of the bushing from getting too hot and smoking and/or burning.

The rotor in other embodiments can include from about two to about eight die ports to form ropes having strands corresponding in number to the number of die ports.

The rotor can be rotated at about 1,000 to 5,000 RPM, preferably about 4,000 RPM. The extrudable food mass can have an extrudate linear rate of about 100 to 200 meters per minute, preferably about 150 m/min. As a result, the extrudate is desirably characterized by having about 0.5 to 5 complete twists per 10 cm. At higher rotational speeds and lower extrudate linear speeds, the rope will be more tightly spun. Conversely, at lower rotation rates and higher extrudate linear speeds the rope so formed will be looser, even forming an open weave pattern to the rope. In more tightly spun ropes, e.g., having 2 to 5 turns per 10 cm, the individual lands or filaments have contact with one another along their longitudinal periphery. More tightly spun roped patterns are particularly desirable for those embodiments containing a center filling. The more tightly spun rope tends to be less susceptible to leakage of the filling. For less tightly spun ropes, gaps can occur between the strands allowing for any filling to escape. In certain variations, however, the filling that escapes can have a different color leading to a visually appealing appearance.

In still other variations, the rope can additionally optionally include one or more peripheral strands or filaments that are not twisted. Such ropes are fabricated from having the chamber having one or more die ports that are on the stationary exterior portion of the die rather than on the rotor. In these embodiments, the rope is formed having one or more peripheral axially extending lands exterior to the rope formed from the unspun dough strands. The products will typically have a series of spaced stationary lands, e.g., at the four corners of a cube and three to eight spun strands.

In those embodiments including a center filling, the products can optionally further include a center filling that can be coextruded with the extrudable food mass to form a central core filling around which the helically twisted strands are spun. The center filling is untwisted.

While in the preferred embodiments the strands are twisted about a common axis to form a spun rope, in other embodiments the strands can be interwoven to form interwoven or laced ropes or woven pieces.

C. Severing the Spun Multistrand Rope

The present invention further comprises the essential step of severing the spun multistrand rope (whether or not center filled) into individual pieces. The pieces are preferably severed while the rope is still in its plastic state (preferably at a temperature of about 49° to 100° C., 120° to 210° F.).

A variety of equipment and techniques are known that can be used to sever the rope into individual pieces. For example, a simple rotating or reciprocating blade can be used to cut the rope into individual segments or pieces. In this embodiment, the center cavity can include open ends. In another severing technique, a reciprocating knife and an anvil surface or pincer knives can be used to both sever the rope into pieces and pinch the ends to form enclosed or ensealed pieces having crimped ends. In still other variations, a cutter/crimper can be used to transform the ropes into cut and crimped pillow shaped pieces. Employment of some cutting and crimping equipment can result in deformation of the rope's visual appearance.

A suitable device for crimping and cutting the spun dough ropes into pillow shaped longitudinal lengths is disclosed in U.S. Pat. No. 5,342,188 (issued 30 Aug. 1994 to C. E. Zimmermann) entitled "Device For Crimping and Cutting Dough Ropes," which is incorporated herein by reference. The device described therein involves a modified improved cutter/crimper roll pair wherein the axially extending cutting/crimping lands are offset from the axes of the rollers at a small angle in the order of 3°.

In still another variation, the rope, preferably without a center filling, is fed to flaking and cutting rolls to form a flaked product (e.g., having a flake thickness of about 0.020 to 0.035 inch) having a visually attractive roped pattern on its two major surfaces.

In the preferred embodiment the extruded and severed pieces for RTE cereals require only minimal further processing. Such further processing can include optional toasting, finish drying (to a moisture content of about 2% to 5%, preferably about 2% to 4%), sugar coating and/or vitamin fortification.

In other variations, the pieces herein can be in the form of half products that are substantially unpuffed, such as for snacks that are of a shelf stable moisture content (e.g., 7% to 12%) but with sufficient retained moisture to puff upon rapid final heating, e.g., deep fat frying, for forming the final consumer product. Potato dough and corn mesa dough formulations are particularly suitable for such snack products. The products of the present invention can thus be further processed to form finished products by deep fat frying to their final moisture content.

The present finished RTE cereal products exhibit surprising and beneficial texture and bowl life properties. More specifically, present finished RTE cereal products, particularly those including high levels of bran ingredients have a much better eating texture than similar compositions formed into conventional RTE cereal shapes. Moreover, RTE cereal products of the present invention exhibit surprisingly greater bowl life than similar RTE cereal compositions fabricated into other conventional RTE cereal shapes. For example, a typical bran formula having a bran content of 25% (7 g/oz) formed into a flaked RTE cereal can have a bowl life of about four minutes before turning soggy. The same formula fabricated into spun and partially puffed pieces of the present invention exhibit a bowl life of about seven to nine minutes.

While not wishing to be bound by the proposed theory, it is speculated herein that the step of twisting the extrudate strands after extrusion and while still in their initial plastic state cause a change in the microstructure of the dough due to the pulling and stretching of the dough. As a result, upon subsequent cooling to room temperature, the starch structure of the finished cereal develops a larger number of very small cells in the matrix structure of the RTE cereals in roped form herein. It is this change in microscopic cell structure that, it is believed, is responsible for the beneficial development of surprising eating qualities as well as the observed increase in bowl life.

EXAMPLE 1

A formulation used to manufacture a high fiber cereal marketed under the brand name Fiber One® was processed according to the present invention to form a finished RTE cereal product. Fiber One contains (dry basis) about 78% wheat and corn brans, about 20% starches and the balance salts and gums. The Fiber One RTE cereal is a finished RTE product in the form of loose filament segments of about 10 mm in length and about 2 to 3 mm in diameter. The ingredients were processed in extrusion equipment designed to form the Fiber One product. A spinning die as described in U.S. Ser. No. 08/452,783 was substituted for the simple conventional die used to prepare the Fiber One product.

The die had four rotating die ports that formed four spun extrudate strands and four stationary die parts that formed four stationary peripheral strands. The spinning revolutions were varied from 1000 to 3000 RPMs. The pressure during extrusion ranged from 1500 to 2500 psig (10343 to 17240 kPa).

The twisted strands puffed to a 2 mm diameter versus normal Fiber One at 2 to 3 mm diameter.

The rope was formed having a hollow center cavity. The rope was cut to form pieces. Both open faced and crimped biscuit pieces were prepared.

The finished present formed product was less gritty and had a more pleasing appearance. Also, the present product had a longer bowl life, nine vs. four minutes in cold milk.

EXAMPLE 2

A high fiber RTE cereal product of the present invention having a center filling was prepared.

The formulation and method of Example 1 was employed to form a twisted rope having a center cavity of about 4 mm in diameter.

In one variation a commercially available strawberry jam was coextruded.

In another variation, a commercially available raisin paste was coextruded.

The ratio of filling to cereal piece was about 1:2.

These finished RTE cereal pieces were pleasingly sweetened by the fillings and did not have a topical presweetening coating applied. The center filled, finished RTE cereal products exhibited similar improvements in bowl life as the unfilled products of Example 1.

RTE cereal products of the present invention similar to those described can be prepared having a topically applied sugar coating.

EXAMPLE 3

A chocolate puffed finished RTE cereal product of the present invention was prepared. The formulation employed was that used to prepare a puffed chocolate corn based RTE cereal marketed under the Cocoa Puffs trademark.

The equipment and processing to prepare the Cocoa Puffs RTE cereal was used except that the spinning die assembly of U.S. Ser. No. 08/452,783 was substituted for the diehead conventionally employed.

The particular die assembly employed created four spinning strands and four stationary strands of cooked cereal dough. The spinning revolutions were varied from 1000 to 3000 RPMs. The pressure ranged from 2000 to 3000 psig (13800 to 20700 kPa). The strands expanded about two to three times their initial diameter upon extrusion. The woven strands puffed to a 4 to 5 mm diameter.

While still in their plastic state, the strands were immediately formed into a rope by the spinning of the die. The rope was formed having a hollow center cavity. The rope was cut to form pieces. Both open faced and crimped biscuit pieces were prepared. The products had about 8 turns per 10 centimeters. The whole rope was about 11 to 12 mm in diameter.

The Cocoa Puff product is in the form of a puffed spherical piece having a diameter of about 10 mm. The typical bowl life of the Cocoa Puff product in cold milk is about four minutes.

Changing only the die, the spinning die formed product had more bowl life, nine vs. four minutes, was less glassy in texture and had a more interesting appearance.

The present finished spun RTE cereal products had a longer bowl life notwithstanding having a much larger surface area per unit of weight.

EXAMPLE 4

A center filled chocolate finished RTE cereal product of the present invention was prepared.

The formulation and method of Example 3 were employed to form a twisted rope having a center cavity of about 3 mm in diameter. Fillings were coextruded into the center of the twisted rope cereal using in one variation the strawberry jam and in a second variation the raisin paste of Example 2. The ratio of filling to cereal piece was about 1:2.

These finished RTE cereal pieces were pleasingly sweetened by the fillings and did not have a topical presweetening coating applied. The center filled, finished RTE cereal products exhibited similar improvements in bowl life as the unfilled products of Example 3 compared to the conventionally prepared puffed spheroid RTE cereal piece.

RTE cereal products of the present invention similar to those described can be prepared having a topically applied sugar coating.

EXAMPLE 5

A finished baked cookie product of the present invention was prepared from the following sugar cookie dry mix formulation:

| Ingredient | Weight % |
|---|---|
| Flour | 50 |
| Sugar | 25 |
| Shortening | 25 |
| | 100% |

An uncooked dough was formed by admixing the formulation in a cold, low pressure extruder. The cookie dough was extruded through a spinning die of similar construction as described in the above examples.

The die had four spinning die ports that formed four spun strands to form a rope and two stationary die ports that formed two strands on the exterior of the spun rope. The spinning revolutions were varied from 500 to 2000 RPMs. The pressure ranged from 100 to 300 psig (690 to 2070 kPa). The ropes had about 7 to 8 turns per 10 centimeters.

The spun ropes were captured on and baked in a band oven for ten minutes at 350° F. The ropes were cut into lengths of about 55 to 70 mm in length. The puffed cookie strands had a dimension of 1 to 2 mm diameter. The finished baked products had a dimension of about 10×5 mm.

The cookie-like finished product so prepared had an interesting appearance and a less crumbly texture than a conventional sugar cookie.

EXAMPLE 6

A whole grain finished RTE cereal of the present invention was prepared that was reminiscent of a shredded wheat biscuit.

A mixture of whole wheat, corn, oats and rice were processed in a high pressure cooker extruder to form a cooked whole grain cereal dough having a moisture content of about 15%.

The whole grain cooked cereal dough was extruded through several spinning dies of similar construction as described in the above examples.

One die formed eight spinning strands and 12 stationary strands. Another die formed two spinning and 24 stationary strands. A third die formed 12 spinning and 40 stationary strands. The spinning revolutions were varied from 1000 to 3000 RPMs. The extrusion pressure ranged from 1000 to 3500 psig (6895 to 20700 kPa).

The woven strands puffed to a 1 to 2 mm diameter. The ropes so formed were crimped into pillow shaped biscuits.

The spun RTE formed product of the present invention had a longer bowl life, ten vs. three minutes, was less glassy, more crisp and had a more interesting appearance as compared to shredded wheat of similarly shaped pieces.

This process has a significant advantage over the conventional means to form shredded products in that total processing time is in the order of minutes versus several hours to overnight.

What is claimed is:

1. A method for preparing spun food pieces, comprising the steps of:
   A. extruding a first extrudable food mass in the form of at least three continuous spaced apart strands along a common line of axis to form a continuous multistrand extrudate array;
   B. twisting at least two of the continuous multistrand extrudate array about the common line of axis to form a spun multistrand rope and
   wherein the rope includes at least one longitudinally extending exterior unspun peripheral strand; and
   C. severing the multistrand rope into pieces.

2. The method of claim 1
   wherein step A includes about 2 to 8 continuous strands each having a diameter of about 1 to 8 mm.

3. The method of claim 2
   wherein the multistrand rope has a center cavity.

4. The method of claim 3
   coextruding the first extrudable food mass through at least one stationary die port to form border strands to the spun multistrand rope.

5. The method of claim 3 wherein the food material is a cooked cereal dough that is at least partially puffed during extrusion.

6. The method of claim 5 wherein in step A the strands are extruded through die ports ranging from about 0.1 to 0.5 mm in diameter.

7. The method of claim 6 wherein step C is practiced to crimp and sever the rope to form pieces having at least two crimped edges.

8. The method of claim 7 wherein step C is practiced to form pillow shaped pieces.

9. The method of claim 8 wherein step C is practiced to form hollow pillow shaped pieces.

10. The method of claim 3 wherein the food material is a cooked cereal dough wherein a center filling is coextruded with the cooked cereal dough.

11. The method of claim 3 wherein in step B at least three strands are spun to form the multistrand rope.

12. The method of claim 6 wherein the cooked cereal dough immediately prior to extrusion has a moisture content of 12% to 35%, a pressure of about 1380 to 21000 kPa and a temperature of about 20° to 150° C.

13. The method of claim 2
    wherein the multistrand rope has about 1 to 20 turns per 10 cm of length.

14. The method of claim 4 wherein the food mass is a sweetened partially dried fruit paste or puree.

15. The method of claim 2 wherein the food mass is an uncooked cereal dough.

16. The product prepared by the process of claim 1.
17. The product prepared by the process of claim 5.
18. The product prepared by the process of claim 8.
19. The product prepared by the process of claim 10.
20. The product prepared by the process of claim 12.
21. The product prepared by the process of claim 14.

22. A method for preparing extruded food pieces, comprising the steps of:
    A. extruding a first extrudable food mass in the form of at least three continuous spaced apart strands to form a continuous multistrand extrudate array;
       wherein each continuous strand has a diameter of about 1 to 8 mm.
    B. forming at least two strands of the continuous multistrand extrudate array into a multistrand rope and wherein the rope includes at least one longitudinally extending exterior unspun peripheral strand; and
    C. severing the multistrand rope into pieces.

23. The method of claim 22
    wherein step B comprises twisting the continuous multistrand extrudate array about the common line of axis to form a spun multistrand rope.

24. The method of claim 1
    wherein step B comprises interweaving the continuous multistrand extrudate to form an interwoven braided rope.

25. The method of claim 24
    wherein the multistrand rope has a center cavity, and wherein step A includes the substep of:
    coextruding a portion of the first extrudable food mass through at least one stationary die port to form border strands to the braided multistrand rope.

26. The method of claim 24 wherein the food mass is a cooked cereal dough that is at least partially puffed during extrusion.

27. The product prepared by the process of claim 22.
28. The product prepared by the process of claim 24.
29. The product prepared by the process of claim 25.
30. The product prepared by the process of claim 26.

* * * * *